Patented Sept. 13, 1927.

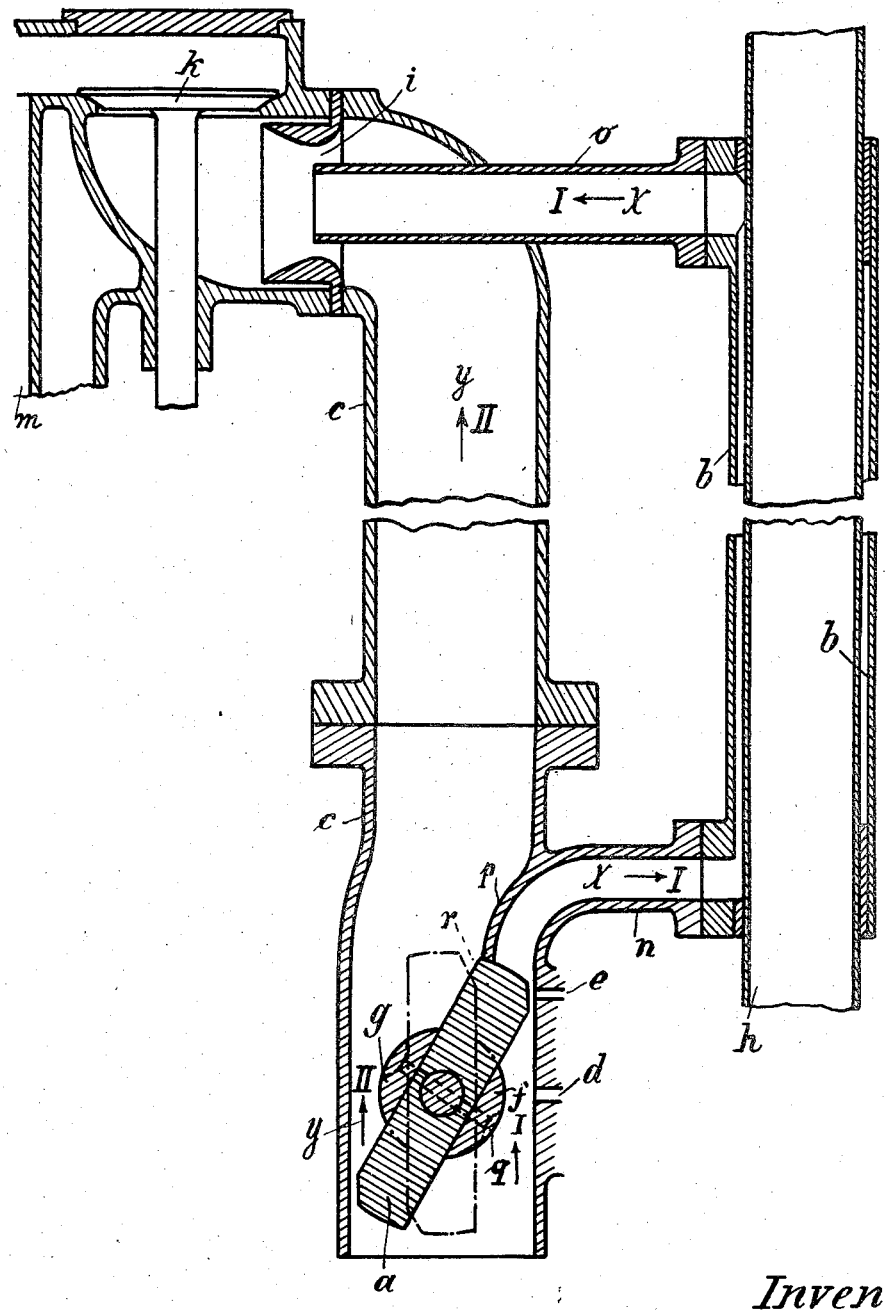

1,641,964

UNITED STATES PATENT OFFICE.

OTTO EBERSBACH, OF BERLIN-WILMERSDORF, GERMANY, ASSIGNOR TO EBRO-VERGASER GESELLSCHAFT MIT BESCHRANKTER HAFTUNG, OF DUSSELDORF, GERMANY.

APPARATUS FOR SUPPLYING COMBUSTIBLE MIXTURE TO INTERNAL-COMBUSTION ENGINES.

Application filed December 23, 1926, Serial No. 156,728, and in Germany November 16, 1922.

My invention relates to improvements in internal combustion engines and more particularly in the construction of the apparatus for the supply of the combustible mixture. One of the objects of the improvements is to provide an apparatus for supplying the combustible mixture in which condensation of fuel, and more particularly heavy fuel, within the intake conduit is made impossible. Another object of the improvements is to provide an apparatus in which the supply of the fuel is regulated independently of the supply of the air for supporting combustion, so that the engine operates with high efficiency for each number of revolutions of the crank shaft. With these objects in view my invention consists in dividing the intake pipe into two branch pipes merging into each other immediately before the intake valve, one of said branch pipes being comparatively small in cross-section and supplying a combustible mixture rich in fuel, and the other one being comparatively large in cross-section and supplying pure air or a very poor mixture. Both currents are mixed with each other immediately before the intake valve, and both branch pipes are provided with regulating means, by means of which the volume of the mixtures flowing through the same are regulated in the same sense and separately from each other. The ratio between the cross-sectional areas of the branch pipe for the supply of current containing a larger proportion of fuel or an over rich mixture and the portion thereof controlled by the regulating means is smaller than the ratio between the cross-sectional areas of the branch pipe for the current containing a smaller proportion of fuel or no fuel and the portion thereof controlled by the regulating means.

In order that my invention be more clearly understood an example embodying the same has been illustrated in the accompanying drawing showing a sectional elevation of the intake pipe and a part of the engine.

In the example shown in the drawing the intake pipe of the internal combustion engine $m$ comprises two branches $b$ and $c$ communicating with each other through branch pipes $n$ and $o$, the pipe $o$ being passed through the wall of the branch pipe $c$ and ending in a reduced portion $i$ thereof. As shown, the branch pipe $n$ is made integral with the bottom part of the pipe $c$, and it extends into the said pipe, as is shown at $p$. In the bottom part of the pipe $c$ there is a throttle valve $a$ engaging the wall of the pipe $c$ and the inwardly projecting part $p$ of the branch pipe $n$ and adapted to divide the current of air taken into the pipe $c$ into two branches I and II, the current I flowing through the branch pipe $n$, the pipe $b$ and the branch pipe $o$ as has been indicated by the arrows $x$. The other current of air II flows through the pipe $c$ and through the reduced portion $i$ thereof to the intake valve $k$. Both currents I and II are combined within and at the rear of the reduced portion $i$ of the pipe $c$, and they are thoroughly intermingled by reason of the ejector action of the branch pipe $o$ and the reduced portion $i$.

The fuel is injected into the intake pipe $c$ from a float chamber (not shown) through bores $d$ and $e$, the bore $e$ being used for injecting fuel when the engine is running under no load, whilst normally the fuel is supplied through bore $d$. Thus, in the position of the throttle valve $a$ shown in the figure the fuel taken in through the bore $d$ is intermingled with the current of air I. If desired, means may be provided for supplying a certain amount of fuel to the current II, which amount should be comparatively small, and may be either of the same character as the fuel injected through the bore $d$, or of a different character.

The throttle valve $a$ has a pair of spherical or segmental blocks $f$ and $g$ removably fixed thereto. As shown the said blocks are fixed to the throttle valve by means of screws $q$. By reason of the said blocks the cross-sectional areas of the air passages for the currents I and II cannot exceed a certain maximum, and the said maximum can be varied by putting in blocks $f$ and $g$ of different forms. The blocks $f$ and $g$ are said to be spherical or segmental, and, as shown in the drawing, the cross-sectional areas provided between the said blocks and the wall of the pipe $c$ are alike. But I wish it to be understood that I do not limit myself to these features. By providing blocks $f$ and $g$ of different form or forms the cross-sectional areas of the currents of air I and II can be varied. In any case the throttle valve should be set so that the velocity of the current of air I flowing through the pipe $b$ is considerably larger than that of the current II flowing through the pipe $c$.

In the figure I have shown a pipe $h$ disposed concentrically of the pipe $b$, which pipe $h$ is connected with the discharge pipe of the engine, so that the air and fuel flowing through the pipe $b$ at high velocity are effectively heated by the waste gases. When gradually turning the throttle valve $a$ in anti-clockwise direction the amount of the combustible mixture flowing through the pipe $b$ will not increase in the same proportion as the amount of the air flowing through the pipe $c$, because the small cross-sectional area of the pipes $n, b, o$ offers a greater resistance to the current I than the pipe $c$ to the current II. Therefore the proportion of fuel in the mixture rushing through the valve $k$ is gradually reduced, until the engine works with the best economical effect in consideration of its number of revolutions. By varying the relative cross-sectional area of the passages provided between the blocks $f$ and $g$ and the wall of the pipe $c$ the highest degree of the economical effect of the engine can be varied.

For further increasing the performance of the engine (its speed and work) the throttle valve $a$ is set in the position shown in the figure in broken lines, in which the throttle valve $a$ is no more in contact with the projecting part $p$ of the branch pipe $n$ and has opened a passage $r$ between the currents I and II so that the vacuum within the pipe $c$ is transmitted to the bores $e$ and $d$ injecting the fuel. Thus, an increased amount of fuel is drawn in, a part of which flows through passage $r$ into pipe $c$ where it is mixed with the current of air II. Thus the relative amount of fuel in the combustible mixture may be increased. Instead of providing the said passage $r$ by opening the throttle valve $a$, I may provide a separate passage in the projecting part $p$ of the branch pipe $n$ and a valve for controlling the said passage.

In the drawing I have shown a single regulating member $a$ controlling both currents I and II and regulating the volume of air and the proportion of liquid fuel contained therein. But I wish it to be understood that I do not limit myself to a construction in which a single regulating member is provided for both passages, and that in some cases separate regulating members are provided, in which case I prefer to connect the said regulating members for operating the same in the same sense. Further, in addition to the single regulating member $a$ the passages for one or both of the currents I and II may be provided with subsidiary regulating members.

While in describing the invention reference has been made to a particular example embodying the same I wish it to be understood that my invention is not limited to the construction shown in the drawing, and that various changes may be made in the general arrangement of the apparatus and the construction of its parts without departing from the invention.

I claim:

1. In apparatus for supplying the combustible mixture to internal combustion engines, a conduit adapted to be connected with the cylinder of the engine and comprising two branch pipes, means to supply a larger proportion of fuel to the current flowing through one of said branch pipes than to the current flowing through the other one of said branch pipes, and means for regulating the amount of air flowing through said branch pipes, the ratio between the cross-sectional areas of the branch pipe for the supply of current containing a larger proportion of fuel and the portion thereof controlled by said regulating means being smaller than the ratio between the cross-sectional areas of the branch pipe for the current containing a smaller proportion of fuel and the portion thereof controlled by said regulating means.

2. In apparatus for supplying the combustible mixture to internal combustion engines, a conduit adapted to be connected with the cylinder of the engine and comprising two branch pipes of different lengths, means to supply a large proportion of fuel to the current flowing through the longer one of said branch pipes than to the current flowing through the shorter one of said branch pipes, means for regulating the amount of air flowing through said branch pipes, and means for heating said longer branch pipe, the ratio between the cross-sectional areas of said longer branch pipe and the part thereof controlled by said regulating means being smaller than the ratio between the cross-sectional areas of said shorter branch pipe and the portion thereof controlled by said regulating means.

3. In apparatus for supplying the combustible mixture to internal combustion engines, a conduit adapted to be connected with the cylinder of the engine and comprising two branch pipes merging into each other at their inlet ends, means to supply a larger proportion of fuel to the current flowing through one of said branch pipes than to the current flowing through the other one of said branch pipes, and a throttle member common to both branch pipes for regulating the amount of air flowing through the same, the ratio between the cross-sectional areas of the branch pipe for the current containing a larger proportion of fuel and the portion thereof controlled by said throttle member being smaller than the ratio between the cross-sectional areas of the branch pipe for the current containing a smaller proportion of fuel and the portion thereof controlled by said throttle member.

4. In apparatus for supplying the combustible mixture to internal combustion engines, a conduit adapted to be connected with the cylinder of the engine and comprising two branch pipes merging into each other at their inlet ends, means to supply a larger proportion of fuel to the current flowing through one of said branch pipes than to the current flowing through the other one of said branch pipes, and a throttle member located at the inlet end of said branch pipes and common to both branch pipes for regulating the amount of air flowing through the same, said throttle member carrying exchangeable blocks for varying the cross-sectional areas included between the same and the wall of said pipe, the ratio between the cross-sectional areas of the branch pipe for the supply of air containing a larger proportion of fuel and the portion thereof controlled by said throttle member being smaller than the ratio between the cross-sectional areas of the branch pipe for the current containing a smaller proportion of fuel and the portion thereof controlled by said throttle member.

5. In apparatus for supplying the combustible mixture to internal combustion engines, a conduit adapted to be connected with the cylinder of the engine and comprising two branch pipes merging into each other at their inlet ends, a throttle member in said pipe in position for controlling the inlets to said branch pipes and adapted to be set in position for providing a passage between itself and the wall of one of said branch pipes and in position whereby the said passage communicates with the other one of said branch pipes at the junction of the said branch pipes, and means to supply fuel into said passage.

6. In apparatus for supplying the combustible mixture to internal combustion engines, a conduit adapted to be connected with the cylinder of the engine and comprising two branch pipes intersecting each other ejector fashion at their discharge ends adjacent the said cylinder, means to supply a larger proportion of fuel to the current flowing through one of said branch pipes than to the current flowing through the other one of said branch pipes, and single means for simultaneously regulating the amount of air flowing through both of said branch pipes.

7. In apparatus of the character described, the combination of a connection adapted for communication with the cylinder of an internal combustion engine, said connection comprising two conduits having their inlet ends in communication and also having their discharge ends in communication, means for supplying fuel to the current flowing through one of said conduits, and means located at the inlet ends of said conduits for regulating the amount of air flowing through both, the ratio between the cross-sectional areas of one of the conduits and the portion thereof controlled by said regulating means being smaller than the ratio between the cross-sectional areas of the other conduit and the portion thereof controlled by said regulating means.

In testimony whereof I affix my signature.

OTTO EBERSBACH.